United States Patent [19]

Kirk

[11] Patent Number: 5,556,156
[45] Date of Patent: Sep. 17, 1996

[54] FLEXIBLE COLLAPSIBLE UTILITY TRUCK BED COVER

[76] Inventor: Alan J. E. Kirk, R.D. #2, Box 533D, Rte. 982, Mt. Pleasant, Pa. 15666

[21] Appl. No.: 130,282

[22] Filed: Oct. 1, 1993

[51] Int. Cl.⁶ ................................. B60P 7/04; B60P 3/34
[52] U.S. Cl. .......................... 296/100; 296/104; 296/109; 296/113; 296/118; 296/43; 296/159; 135/88.05
[58] Field of Search ....................... 296/104, 100, 296/102, 105, 113, 118, 43, 109, 159; 135/88; 411/55, 57, 60, 63, 64

[56] References Cited

U.S. PATENT DOCUMENTS

| | | | |
|---|---|---|---|
| 356,470 | 1/1887 | Hooper | 296/113 |
| 1,639,970 | 8/1927 | Riddle | 296/43 |
| 3,231,305 | 1/1966 | Beckman | 296/100 |
| 3,688,787 | 9/1972 | Feather | 296/100 |
| 3,773,379 | 11/1973 | Loiseau | 296/100 X |
| 3,901,548 | 5/1974 | Seaman, Jr. | 296/10 |
| 4,252,363 | 2/1981 | Rodrigue | 296/100 |
| 4,263,925 | 4/1981 | Arganbright | 135/88 X |
| 4,285,539 | 8/1981 | Cole | 296/100 X |
| 4,289,346 | 9/1981 | Rourgeois | 296/105 |
| 4,721,336 | 1/1988 | Jones | 296/100 |
| 4,756,325 | 7/1988 | Daniels | 296/105 X |
| 4,789,196 | 12/1988 | Fields | 296/100 |
| 4,883,394 | 11/1989 | Van Der Woude | 411/55 X |
| 5,056,855 | 10/1991 | Moravsky | 296/105 X |
| 5,141,277 | 8/1992 | Alexander | 296/43 |
| 5,186,513 | 2/1993 | Strother | 296/100 |
| 5,224,807 | 7/1993 | Belser | 411/55 X |
| 5,353,826 | 10/1994 | Davis | 296/100 X |

FOREIGN PATENT DOCUMENTS 1575548  7/1969  France ........................ 411/60

Primary Examiner—Dennis H. Pedder
Attorney, Agent, or Firm—Daniel J. Long

[57] ABSTRACT

Disclosed is a utility truck bed cover which consists of a rigid frame section which supports a flexible tarpaulin section. The frame section comprises a plurality of bow-shaped members arranged in spaced parallel arrangement which pivot longitudinally to allow stretching of the tarpaulin. The frame members are segmented to allow detachment for storage and shipment. The frame members may also be mounted in the side wall apertures of the truck by means of a unique clamping arrangement. The frame members may also be mounted on wheels on a longitudinal track to facilitate collapsing the cover.

11 Claims, 6 Drawing Sheets

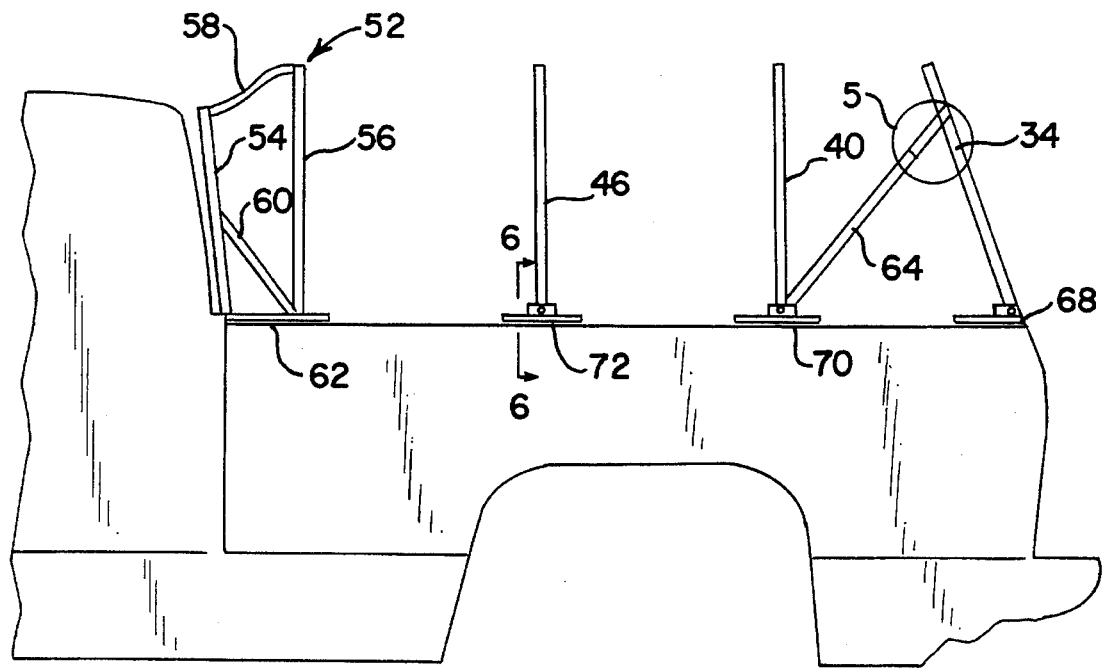
FIG_4
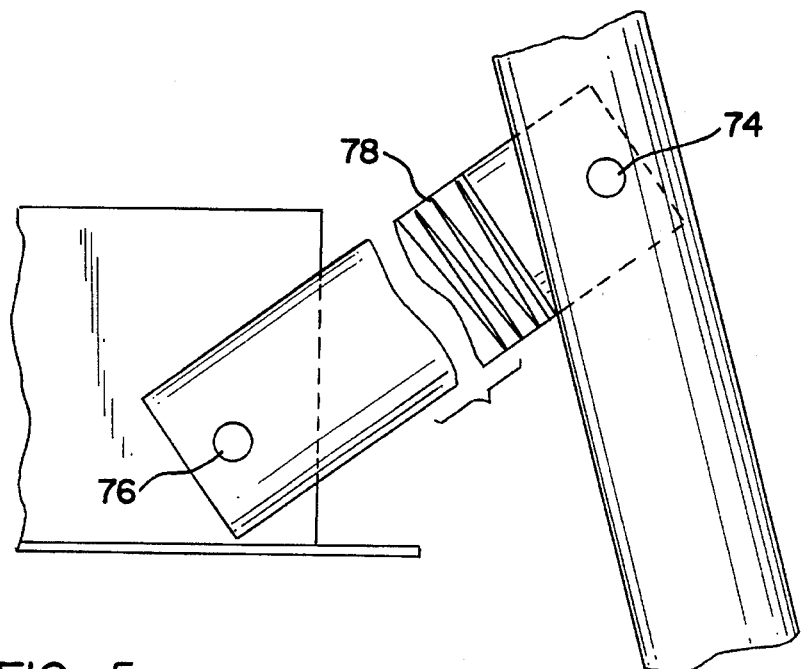
FIG. 5

FLEXIBLE COLLAPSIBLE UTILITY TRUCK BED COVER

BACKGROUND OF THE INVENTION

1. Field of the Invention

The present invention relates to land vehicles and in particular to utility truck bed covers.

2. Brief Description of the Prior Art

Bed covers are a popular and useful accessories for utility trucks. Very often such bed covers comprise a rigid structure which are permanently affixed to the utility truck. Disadvantages to such structures are that they are often relatively heavy and may adversely affect fuel efficiency on vehicles on which they are installed and that they often require relatively large amounts of space for their transportation and storage before installation. Further, the installation of such covers is often a relatively time consuming and expensive procedure, often done by a specialist.

It has also been suggested that bed covers be constructed of flexible materials which are supported on a rigid frame. Such arrangements are shown, for example, in U.S. Pat. Nos. 3,688,787, 4,289,346, 3,901,548 and 3,231,305. While such arrangements would appear to be lighter in weight than most rigid bed covers, they would also appear to be relatively expensive and time consuming to install.

It is, therefore, the object of the present invention to provide an utility truck bed cover which is light in weight, which can be easily installed by the truck owner and which requires only a small amount of space during storage and shipment. It is a further object of the present invention to provide a utility truck bed cover which may be removed when the truck operator is not carrying cargo requiring such a cover.

SUMMARY OF THE INVENTION

The utility truck bed cover of the present invention comprises a rigid frame section which supports a flexible tarpaulin member. The frame section comprises a plurality of generally bow-shaped rigid members that project upwardly from the two lateral sides of the bed. These bow-shaped members are segmented into a number of longitudinally aligned detachable sections which abut end to end. They pivot longitudinally to allow the tarpaulin to be stretched over them and preferably there is a spring loaded stretch arm between the rear section and its adjacent section to facilitate such stretching of the tarp arm. This pivoting connection allows the tarpaulin to be easily stretched to an adequate degree on the frame. These bow-shaped frame members may be attached to conventional apertures in the side wall of the truck by means of a bracket having a central aperture which aligns with the aperture in the truck wall. A clamp which comprises an upper female v block and a lower male v block with a medial bolt engaging the male v block may be inserted through the aligned apertures when the bolt is tightened the female v block expands to fix the bracket against the upper planar surface of the lateral truck wall. The frame member may also be mounted on wheels on a longitudinal track to facilitate collapsing the cover.

BRIEF DESCRIPTION OF THE DRAWINGS

The truck bed cover of the present invention is further described with reference to the accompanying drawings in which:

FIG. 4 is a front elevation view with the rigid frame portion of the cover in combination with a utility truck shown in fragment;

FIG. 5 is a fragmented detailed cut away view of the stretched arm member of the frame section shown in part in circle 5 in FIG. 4;

DETAILED DESCRIPTION OF THE DRAWINGS

Figure 1:
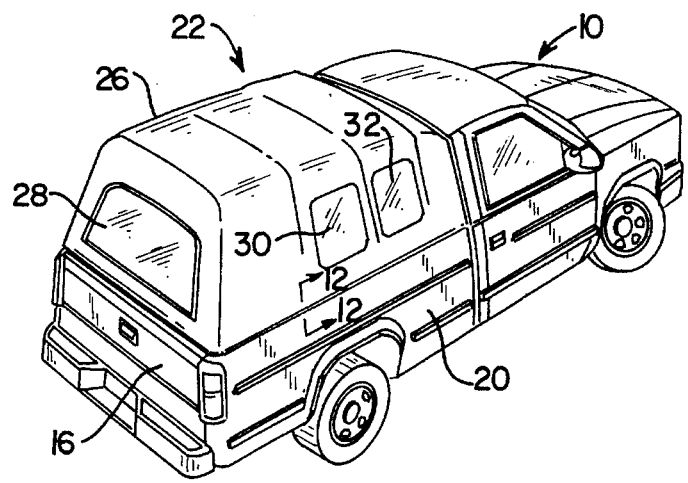
FIG. 1 is a perspective view of the truck bed cover in combination with a utility truck.
Figure 2:
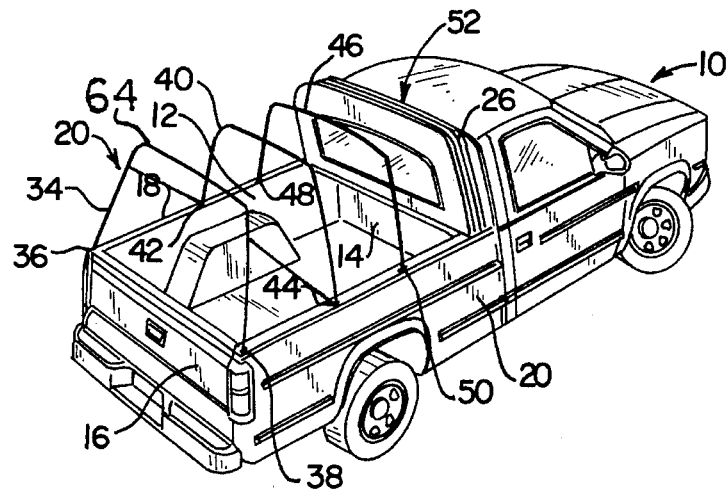
FIG. 2 is a perspective view of the truck bed cover shown in FIG. 1 is its collapsed position with the rigid frame structure in place.
Figure 3:
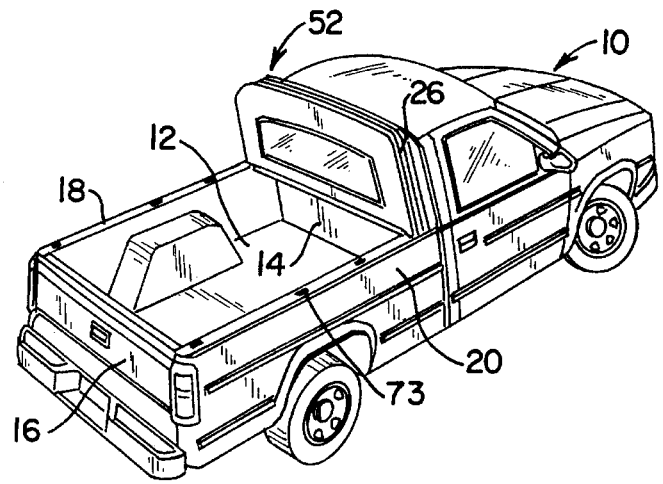
FIG. 3 is a perspective view of the truck bed cover shown in FIG. 1 in its collapsed position with the rigid frame structure removed.
Figure 6:
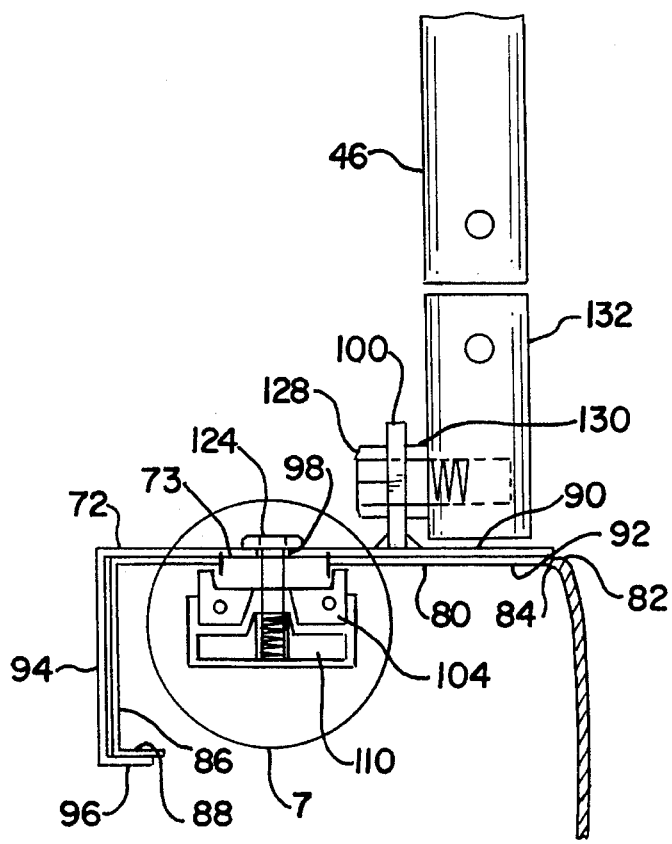
FIG. 6 is a detailed cross sectional view through line 6—6 in FIG. 4.
Figures 7, 7A, 7B, 7C:
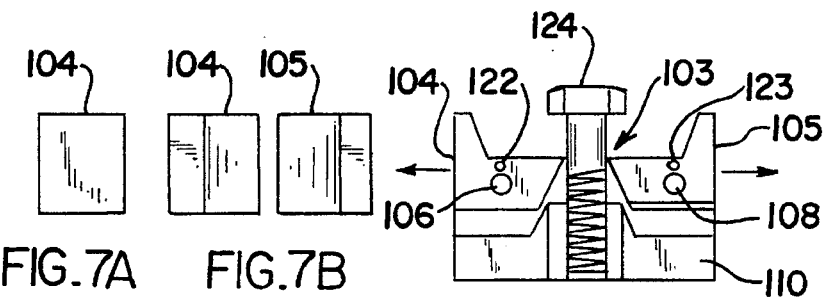
FIG. 7 is an enlarged view showing the coupling mechanism in circle 7 of FIG. 6 in which the truck lateral wall and bracket have been omitted.
FIGS. 7A and 7B are end and plan views of the female v block shown in FIG. 7.
FIG. 7C is an end view of the male v block shown in FIG. 7.
Figures 8, 8A, 8B:
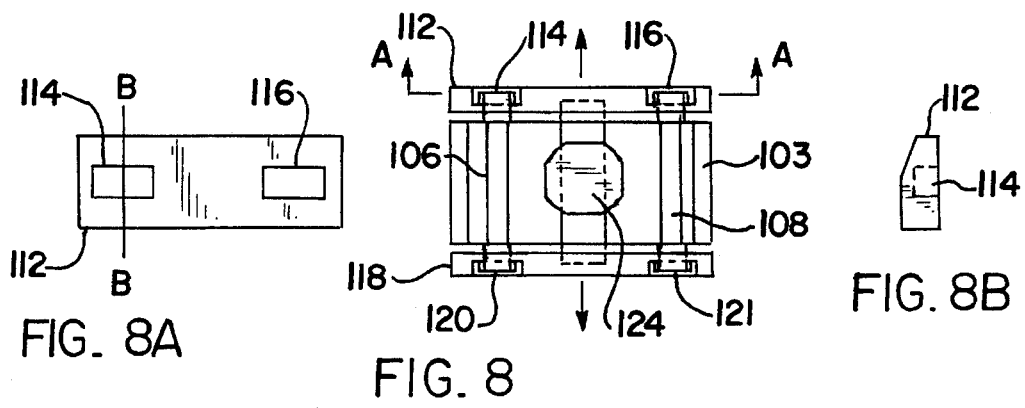
FIG. 8 is a plan view of the coupling mechanism shown in FIG. 7.
FIG. 8A is a cross sectional view taken through line A—A in FIG. 8 showing an end plate.
FIG. 8B is a cross sectional view of an end plate taken through line B—B in FIG. 8A.
Figure 9:
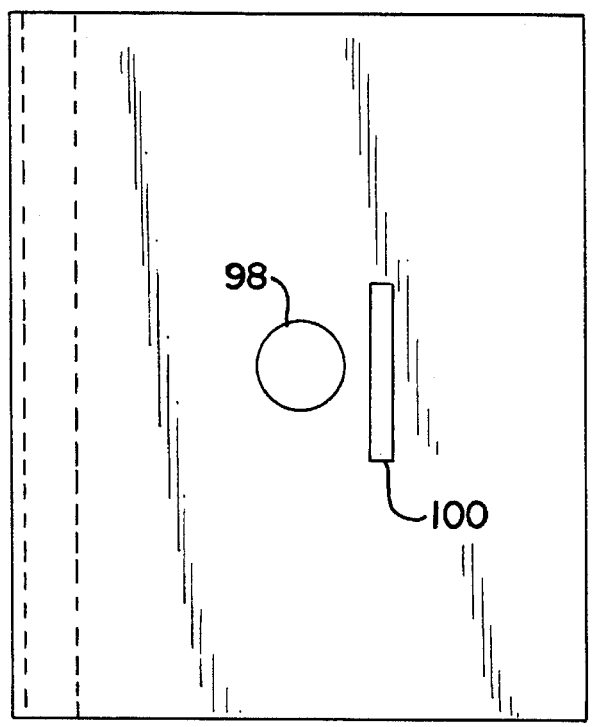
FIG. 9 is a plan view of the bracket used in the coupling mechanism shown in FIG. 7.

Referring to FIGS. 1–4, the bed cover of the present invention is used on a utility truck shown generally at numeral 10. This utility truck has an open bed 12 which is surrounded by upwardly projecting front wall 14, rear wall 16 which is conventionally equipped with a gate and with first and second later walls 18 and 20. The truck bed cover shown generally at 22 comprises a rigid frame member shown generally at 24 and a flexible tarpaulin section shown generally at 26. This tarpaulin includes plastic transparent windows as at 28, 30 and 32. The frame section includes a rearward frame member 34 which is attached to the first and second lateral walls respectively by first terminal end 36 and a second terminal end 38. Adjacent the rearward frame member there is another frame member 40 which is attached to the first and second lateral walls respectively by a first terminal end 42 and a second terminal end 44. Another frame member 46 is similarly attached to the first and second lateral walls by first terminal end 48 and second terminal end 50. At the front end of the bed there is a tarpaulin receiving structure shown generally at 52 which includes parallel front and rear bow shaped members 54 and 56 a medial longitudinal member 58 and a pair of diagonal members as at 60. This tarpaulin receiving structure is mounted on the lateral side walls by means of brackets as at 62. The frame section will also include a stretching arm member between the rearward frame member and its adjacent frame member as at 64 and 66. Referring particularly to FIG. 4 it will be seen that frame member 34 is pivotally attached to the lateral walls by means of brackets as at 68 so as to allow that frame member to pivot through a vertical arc longitudinally. It will also be seen that frame members 40 and 46 are similarly pivotally attached to the lateral walls by means of brackets as at 70 and 72. It will also be seen that the frame members are mounted in the pre-existing apertures as at 73 (FIG. 3) in the upper planar surfaces of the lateral walls. Referring to FIG. 5 it will be seen that stretching arm 64 is pivotally connected to member 34 by pin 74 and to bracket 70 by pin 76. It will stretch along its longitudinal axis by means of spring 78. Referring to FIGS. 7–9, it will be seen that the lateral wall of the truck has a top planar section 80 with an upper side 80 with an upper side 82 and a lower side 84 and from this top planar section there is a downward extension 86 and an inward extension 88. It will also be seen that the bracket 72 has an upper side 90, a lower side 92 and a downward extension 94 and an inward extension 96 to fit over the top planar section the downward extension and the inward extension of the later side wall of the truck. The bracket also has a central aperture 98 which aligns with an aperture as at 73 in the truck wall. Also included in the bracket is an upward longitudinal projection 100. The bracket is fastened to the lateral wall by means of a clamp shown generally at 102. This clamp consists of a female v block generally at 103 which has separate sides 104 and 105 which has apertures to receive pins 106 and 108. The clamp also includes a male v block 110, side plate 112 having slots 114 and 116 which receive respectively the pin 106 and side plate 118 having slots 120 and 121 which also receive said pins. There are also transverse apertures 122 and 123 through which springs pass to be connected to both side plates. There is also a medial vertical bolt 124 which passes through plate 126 and engages the male v block. As this bolt is tightened, the female v block expands in the direction shown in the arrows in FIG. 7 and the side plates expand in the direction shown in the arrows in FIG. 8 in the arrows to extend beyond the edges of the apertures 73 and fasten the bracket to the top planar section of the lateral wall. From FIG. 6 it will also be seen that bolt 128 passes through an aperture in projection 100 to engage through washer 130 member retaining sleeve 132. This sleeve engages member 46 and allows it to pivot longitudinally in a vertical arc by means of the rotation of bolts 128 in the aperture of the projection.

Figure 10:
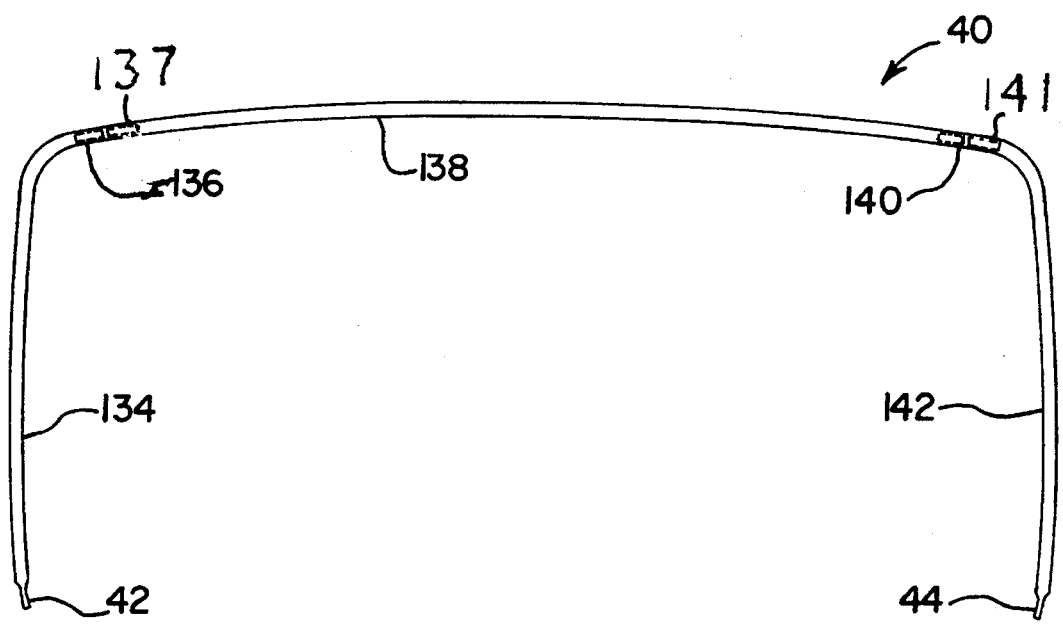
FIG. 10 is a view of one of the rigid support members in fragment from line 10—10 in FIG. 4.

Referring to FIG. 10, it will be seen that frame member 40 has a first 42 and second 44 terminal ends. A first segment 134 has as its upper end a sleeve 136 by means of which it can be removably attached by means of fasteners 137 to a second segment 138. This second segment can itself be removably attached by a sleeve 140 having fasteners 141 to a third segment 142. The other frame members are similarly constructed.

Figure 11:
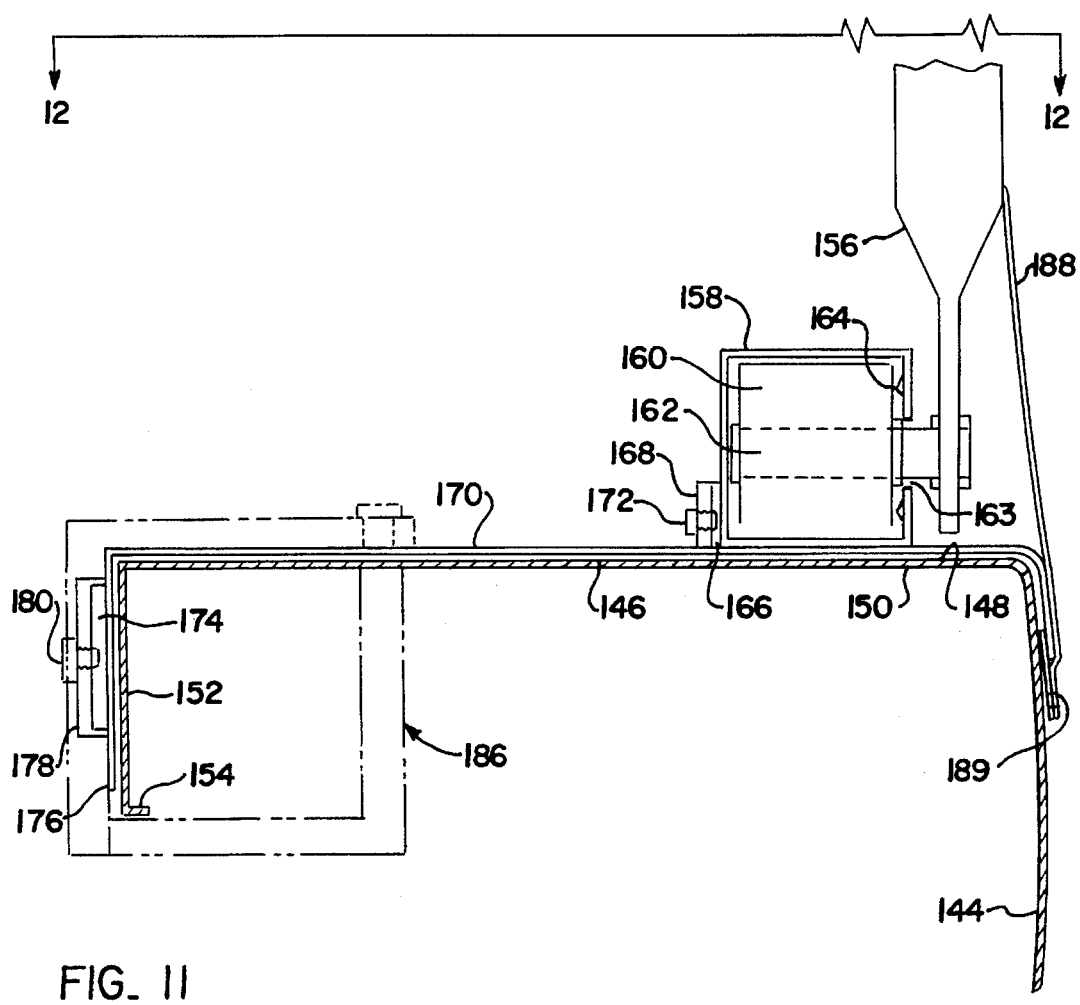
FIG. 11 is a cross sectional view as would be taken through line 12—12 of FIG. 1 showing an alternate embodiment of the truck be cover of the present invention and in particular, the connection of the frame to the bed.
Figure 12:
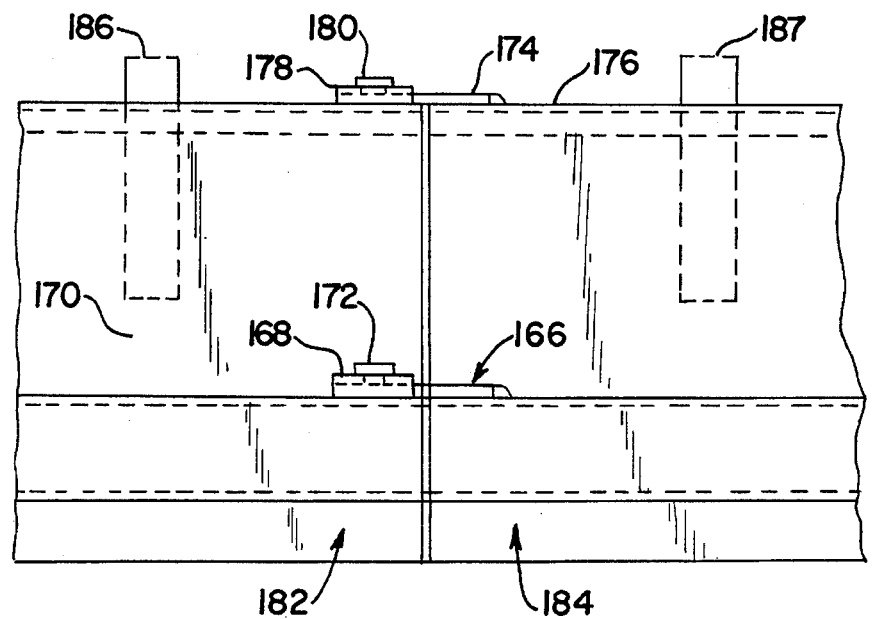
FIG. 12 is a plan view of the connecting mechanism shown in FIG. 11 from line 12—12.

Referring to FIGS. 11 and 12 an alternative way of attaching the frame to the lateral walls is shown. A lateral wall 144 having a top planar section 146 with an upper side 148 and a lower side 150 has a downward extension 152 with an inward extension 154. A rigid frame member 156 may move along a elongated cylindrical track 158 by means of a wheel 160 mounted inside said track. A transverse wheel axle 162 extends through an elongated slot 163 to pivotally engage the rigid support member. Spacers as at 164 are provided to reduce or eliminate wheel drag. The cylindrical track is clamped on to the lateral wall by means of a sleeve 166 that is welded at is forward end to the track and rearwardly engages plate 168 plate which extends upwardly from the bracket 170 overlying the upper side of the top planar section of the wall and which plate is tighten against the sleeve by means of bolt 172. Another sleeve 174 is welded to a downward extension 176 of the bracket. This sleeve engages plate 178 which is tighten against the downward extension of the bracket by bolt 180. It will also be seen that this entire device is segmented into two general sections 182 and 184 to facilitate shipping and storage. Both of those segments are clamped onto the truck lateral wall by means of clamps as are shown generally at 186 and 187. It will also be seen that the tarpaulin 188 is fixed to bracket 170 by means of clip 189 which is sewn into the tarpaulin fabric.

Figure 13:
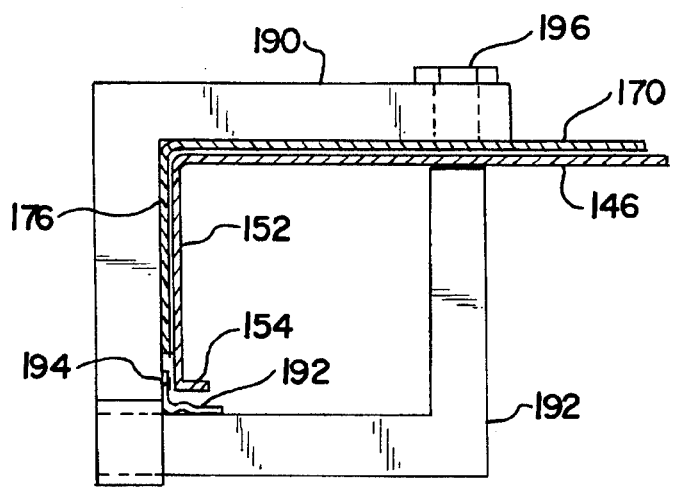
FIG. 13 is an end view of a clamp used in the connecting mechanism shown in FIGS. 11 and 12.
Figure 14:
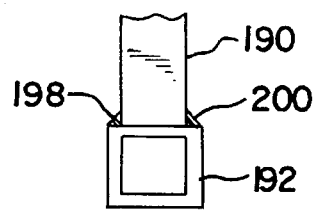
FIG. 14 is a fragmented side view of the clamp shown in FIG. 13.

Referring to FIGS. 13 and 14, the clamp section 186 includes a top clamp section 190 and a bottom clamp section 192, a spring clip which is riveted by rivet 194 into the top clamp section and a bolt 196. The top clamp section is also welded onto the bottom clamp section at weld points 198 and 200 the bracket 170 and its downward extension 176 and held in engagement with the top planar section 146 of the lateral wall and its downward extension by means of this arrangement. Preferably this longitudinal track arrangement would be used on both lateral walls and all the rigid frame members except for the tarpaulin receiving structure would be mounted in the way described above on it.

It will be appreciated that there has been described a utility truck bed cover which is light weight and which takes little space to ship or store. This cover can also be easily or quickly collapsed to its forward storage position. It can alternatively, with relative ease, be completely removed when a cover is not required and then reinstalled when use of a cover is again desired.

Although the invention has been described with a certain degree of particularity, it is to be understood that the present disclosure has been made only as an example and that the scope of the invention is defined by what is hereafter claimed.

What is claimed is:

1. In combination with a utility truck having an open bed with front and rear walls projecting upwardly from said bed and first and second lateral walls upwardly projecting from said bed and perpendicularly interposed between said front and rear walls, a truck bed cover comprising a frame section comprising plurality of rigid frame members and a flexible tarpaulin section, said frame member having first and second terminal ends and being fixed at the first end to the first side wall of the bed and projecting upwardly then laterally then downwardly and being fixed at its second terminal end to the second lateral wall and said rigid frame members together supporting the flexible tarpaulin section, wherein each of the rigid frame members is segmented into a plurality of sections abutting end to end and wherein the plurality of rigid frame members includes a rearwardly positioned rear rigid frame member which is pivotally connected to the first and second lateral walls to pivot longitudinally in a vertical arc, respectively, at its first and second terminal ends and there is a supporting rigid frame member positioned adjacent to and longitudinally forward of the rear rigid frame member and from a point adjacent to where the supporting rigid frame member is connected to one of said lateral walls there is at least one arm means which extends to be connected to and support the rear rigid frame member.

2. The truck bed cover of claim 1 wherein each of the rigid frame members is segmented into three sections.

3. The bed cover of claim 1 wherein the rigid frame members are bow shaped.

4. The bed cover of claim 1 wherein a plurality of the rigid frame members are positioned in generally parallel arrangement.

5. The truck bed cover of claim 4 wherein the supporting rigid frame member is pivotally connected adjacent to the first and second lateral walls to pivot longitudinally in a vertical arc, respectively, at its first and second terminal ends and wherein the arm means comprises a first arm member and second arm member which are pivotally connected adjacent to the rigid supporting frame member, respectively, adjacent the first and second terminal ends and extend rearwardly and upwardly to be pivotally connected, respectively, to the first and second sections of the rear rigid frame member.

6. The truck bed cover of claim 5 wherein at least one other rigid frame member is positioned forward of and in parallel arrangement with the rear rigid supporting frame member and wherein said other rigid frame member is pivotally connected at its first and second terminal ends, respectively, to the lateral walls to pivot longitudinally in an vertical arc.

7. The truck bed cover of claim 1 wherein a flexible tarpaulin receiving structure is mounted over the front wall of the bed and said flexible tarpaulin receiving structure comprises longitudinally spaced bow-shaped members each connected at first and second terminal ends respectively to the first and second lateral walls and connected by a medial longitudinal member and a pair of diagonal members.

8. The truck bed cover of claim 1 wherein the lateral walls of the truck bed have a planar top surface and the rigid frame members project upwardly from said planar top surface.

9. The truck bed cover of claim 8 wherein there are a plurality of apertures in the top planar surface and at least one of the rigid support members is mounted by means of one of said apertures.

10. The truck bed cover of claim 4 wherein there are a plurality of apertures in the top planar surface and at least one of the rigid support members is mounted by means of one of said apertures.

11. The truck bed cover of claim 10 wherein the rigid support member is mounted on a bracket having a central aperture which is aligned with an aperture in the top planer surface of one of the lateral walls and which is fixed to said lateral wall by clamping means passing through both of said apertures.

* * * * *